United States Patent [19]
Lyons et al.

[11] Patent Number: 5,931,324
[45] Date of Patent: Aug. 3, 1999

[54] PLASTIC CONTAINER AND NON-INTEGRAL HANDLE

[75] Inventors: Crawford Lyons, Spring Grove, Pa.; Frank E. Semersky, Toledo, Ohio; Robert L. Diller, Jacobus; John W. Tobias, Lancaster, both of Pa.

[73] Assignee: Graham Packaging Company, L.P., York, Pa.

[21] Appl. No.: 08/837,563

[22] Filed: Apr. 21, 1997

Related U.S. Application Data

[60] Continuation-in-part of application No. 08/723,895, Sep. 30, 1996, Pat. No. 5,704,506, which is a division of application No. 08/414,646, Mar. 31, 1995, Pat. No. 5,622,579.

[51] Int. Cl.$^6$ .................................................. B65D 23/10
[52] U.S. Cl. ..................... 215/398; 220/752; 156/73.1; 156/580.1
[58] Field of Search .................................. 215/386, 396, 215/398, 384; 220/752, 758, 769, 770; 156/73.1, 580.1, 580.2; 16/110 R, 111 R

[56] References Cited

U.S. PATENT DOCUMENTS

| | | |
|---|---|---|
| 3,819,437 | 6/1974 | Paine . |
| 4,169,751 | 10/1979 | Yen . |
| 4,211,923 | 7/1980 | Fukuyama et al. . |
| 4,230,757 | 10/1980 | Toner . |
| 4,257,525 | 3/1981 | Thompson . |
| 4,273,246 | 6/1981 | Thompson . |
| 4,280,859 | 7/1981 | Thompson . |
| 4,293,359 | 10/1981 | Jakobsen . |
| 4,326,902 | 4/1982 | Peddie . |
| 4,368,826 | 1/1983 | Thompson . |
| 4,372,454 | 2/1983 | Thompson . |
| 4,564,932 | 1/1986 | Lange . |
| 4,618,516 | 10/1986 | Sager . |
| 4,629,598 | 12/1986 | Thompson . |
| 4,647,325 | 3/1987 | Bach . |
| 4,726,480 | 2/1988 | Hagan . |
| 4,726,481 | 2/1988 | Hagan . |
| 4,746,025 | 5/1988 | Krautkramer . |
| 4,767,492 | 8/1988 | Fukusima et al. . |
| 4,834,819 | 5/1989 | Todo et al. . |
| 4,915,241 | 4/1990 | Morimura et al. ...................... 215/398 |
| 4,931,114 | 6/1990 | Sliva . |
| 4,954,191 | 9/1990 | Delespaul . |
| 5,040,357 | 8/1991 | Ingemann . |
| 5,110,041 | 5/1992 | Keeler . |
| 5,244,520 | 9/1993 | Gordon et al. . |
| 5,256,225 | 10/1993 | Dwinell . |
| 5,269,917 | 12/1993 | Stankowski . |
| 5,275,767 | 1/1994 | Micciche . |
| 5,304,265 | 4/1994 | Keeler . |
| 5,316,603 | 5/1994 | Akazawa et al. . |
| 5,401,342 | 3/1995 | Vincent et al. . |
| 5,403,415 | 4/1995 | Schembri . |
| 5,435,863 | 7/1995 | Frantz . |
| 5,704,506 | 1/1998 | Tobias et al. ........................... 215/398 |
| 5,769,256 | 6/1998 | Medal .................................... 215/398 |

OTHER PUBLICATIONS

Plastics Technology publication, Jan. 1996—"Better Bonds" by John De Gaspari.

*Primary Examiner*—Stephen P. Garbe
*Assistant Examiner*—Tri M. Mai
*Attorney, Agent, or Firm*—Howson and Howson

[57] ABSTRACT

A blow-molded plastic container and a separately formed injection-molded plastic handle adapted to be ultrasonically welded together. A pattern of energy directors is located on one of the confronting welding areas of the handle and the container sidewall. The handle has an elongate grip defining a grip centerline and the energy directors are located on both sides of the grip centerline adjacent opposite ends of the elongate grip.

11 Claims, 10 Drawing Sheets

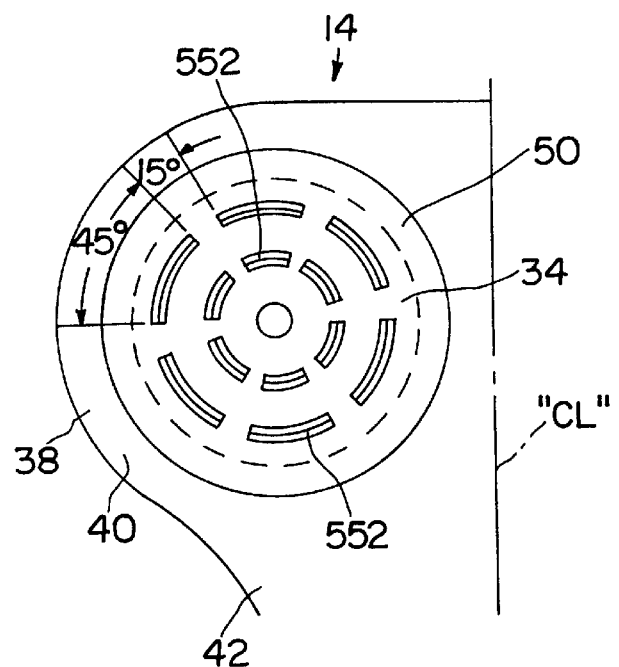
FIG. 13
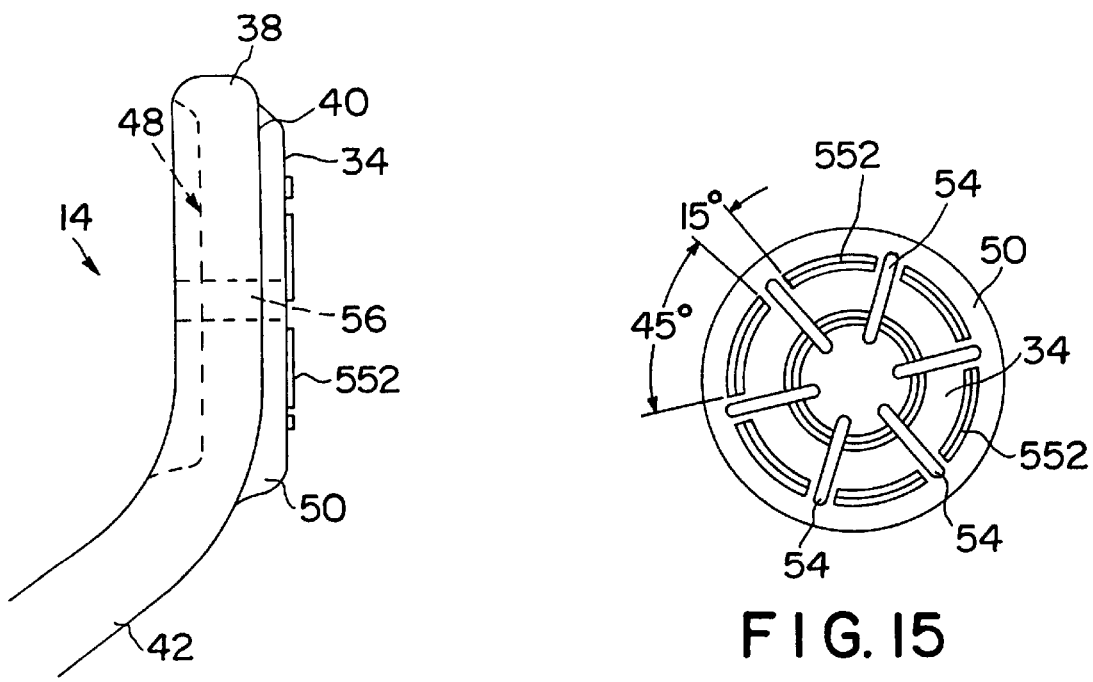
FIG. 14
FIG. 15

PLASTIC CONTAINER AND NON-INTEGRAL HANDLE

This application is a continuation-in-part of U.S. application Ser. No. 08/723,895 filed on Sep. 30, 1996 now U.S. Pat. No. 5,704,506 which is a division of U.S. application Ser. No. 08/414,646 filed on Mar. 31, 1995, now U.S. Pat. No. 5,622,579.

FIELD OF THE INVENTION

The present invention relates to a blow-molded plastic container having a permanently attached separate plastic handle, and more particularly, the present invention relates to energy directors which melt upon application of ultrasonic energy to form a permanent bond between the container and handle.

BACKGROUND OF THE INVENTION

The use of blow-molded plastic containers has become very commonplace in packaging beverages and other liquid, gel, or granular products. In the packaging of beverages, especially juice, blow-molded plastic PET containers are particularly useful in the so-called "hot-fill" process, i.e. filling the containers with beverages at an elevated temperature, sealing the containers, and then allowing the beverage to cool. Blow-molded plastic containers can have vacuum flex panels which provide sufficient flexure to compensate for the changes of pressure and temperature, while maintaining structural integrity and aesthetic appearance.

Some containers benefit from the use of handles to facilitate a consumer's capability to lift the container and pour its contents either with one or two hands. Smaller sized containers, such as 64 ounces and below, generally do not need handles because a consumer can readily grasp the sides of the container to manipulate the container. However, larger containers, such as gallon containers, may require some form of handle in order for a consumer to control the container while lifting or pouring its contents especially with one hand.

Blow-molded containers having handles have been manufactured using a variety of techniques. For example, handles have been blow-molded integral with the containers. Some containers have separately formed handles which snap into engagement with the neck of the container. Container preforms have been injection molded with handles integral with the neck of the preform. Separately formed plastic handles have been secured to the sidewall of containers by blow-molding the container body around a portion of the handle to capture the handle in place. Separately formed handles have been snap fit into engagement with concavities formed in the sidewalls of fully blow-molded container bodies.

Although various ones of the referenced techniques for producing a blow-molded container having a handle may be satisfactory for their intended purposes, there is a need for a more cost effective and efficient technique for producing blow-molded plastic containers having separately formed, permanently attached handles.

In an effort to meet this need, the assignee of the present application developed hot-fillable, blow-molded containers which are produced by welding a completely separate, injection-molded plastic handle to a fully molded, plastic container. The containers and methods of manufacture are disclosed in pending U.S. patent application Ser. Nos. 08/414,646, 08/694,348 and 08/723,895 which the assignee of the present applications owns. One of the welding techniques disclosed in these applications involves the use of ultrasonic energy to melt the confronting surfaces of the handle and container to produce a weld therebetween.

Ultrasonic energy has been used previously to weld together confronting surfaces of containers and attachments. U.S. Pat. Nos. 4,273,246, 4,280,859, 4,368,826 and 4,372,454 issued to Thompson disclose ultrasonically welding a handle to a container. U.S. Pat. No. 4,293,359 issued to Jakobsen discloses welding a base support cup to the base of a plastic blow-molded container. U.S. Pat. No. 5,275,767 issued to Micciche discloses connecting a base to a sidewall of a container. U.S. Pat. No. 5,256,225 issued to Dwinell; U.S. Pat. No. 5,244,520 issued to Gordon et al.; U.S. Pat. No. 4,726,481 issued to Hagan; U.S. Pat. No. 5,304,265 issued to Keeler; and U.S. Pat. No. 4,746,025 issued to Krautkramer et al. disclose the welding of nozzles, spouts and neck inserts to containers. U.S. Pat. No. 5,040,357 issued to Ingemann; U.S. Pat. No. 4,954,191 issued to Delespaul et al.; and U.S. Pat. No. 5,316,603 issued to Akazawa disclose the welding of lids, covers and seals to containers.

In the course of welding confronting surfaces with ultrasonic energy, so-called "energy directors", or "energy absorbers" are customarily used to provide a strong weld. The energy director is a small raised pattern of plastic which is located between confronting surfaces. The geometry of the energy directors induces them to melt at a fast rate, and the resulting molten pads of plastic cool and harden thereby forming a strong weld.

Various shapes and patterns of energy directors have been used to create a bond between confronting surfaces. For example, the above referenced '359 Jakobsen patent discloses the use of energy directors shaped either as circles or as radially extending spokes for welding a base cup to a container. See FIGS. 10 and 11 of Jakobsen. U.S. Pat. No. 4,326,902 issued to Peddie discloses star-shaped, circular and cruciform energy directors for forming a weld between thermoplastic sheets. The use of a plurality of parallel ridge-shaped energy directors for welding together thermoplastic sheets is disclosed in U.S. Pat. No. 3,819,437 issued to Paine, U.S. Pat. No. 4,169,751 issued to Yen and U.S. Pat. No. 4,230,757 issued to Toner. U.S. Pat. No. 4,931,114 issued to Silva discloses the use of parallel ridge energy directors for welding a pompon streamer to a grip. The use of a plurality of concentric and interrupted circular energy directors to weld together an optical disc is disclosed by U.S. Pat. No. 4,564,932 issued to Lange. The use of a plurality of spike-shaped energy directors arranged in an annular array for welding together an optical disc is disclosed in U.S. Pat. No. 4,834,819 issued to Todo. Such a pattern is also disclosed in U.S. Pat. No. 5,403,415 issued to Schembri for welding a blood analysis circular rotor. An annular energy director is disclosed in U.S. Pat. No. 5,269,917 issued to Stankowski to weld together opposite halves of a filter housing.

Although various ones of the referenced energy director patterns may function satisfactorily for their intended purposes, there is a need for energy directors which maximize bonding strength between a plastic container and a separate plastic handle ultrasonically welded thereto. The bond should be sufficiently strong to permit lifting of a filled container having a capacity of one gallon or more. In addition, the container, the handle and the bond therebetween should be capable of withstanding the stresses and strains associated with hot-filling and handling of the container. Finally, the formation of the weld should be capable of being accomplished efficiently.

OBJECTS OF THE INVENTION

With the foregoing in mind, a primary object of the present invention is to provide a blow-molded container having an injection-molded handle which is permanently welded thereto using ultrasonic energy.

Another object of the present invention is to provide a strong handle-to-container weld capable of withstanding forces encountered during filling, shipping and handling.

A further object is to provide a container and permanently attached separate handle which is inexpensive to manufacture, structurally sound, aesthetically appealing, ergonomically acceptable, and environmentally beneficial.

SUMMARY OF THE INVENTION

More specifically, the present invention provides a blow-molded plastic container and separate injection-molded plastic handle adapted to be permanently welded together using ultrasonic energy. The container has a surface which engages a complementary surface on the handle. At least one specially configured energy director is formed on one of the surfaces and is melted by the ultrasonic energy to weld the handle to the container.

BRIEF DESCRIPTION OF THE DRAWINGS

The foregoing and other objects, features and advantages of the present invention should become apparent from the following description when taken in conjunction with the accompanying drawings, in which:

FIG. 13 is a partial elevational view of one embodiment of a welding area for the handle shown in FIG. 3;

FIG. 14 is a side elevational view of the partial handle illustrated in FIG. 13;

FIG. 15 is an alternate welding area which is similar to that of FIG. 13 except with canals cut into the surface of the welding area;

DETAILED DESCRIPTION OF THE PREFERRED EMBODIMENTS

Figure 1:
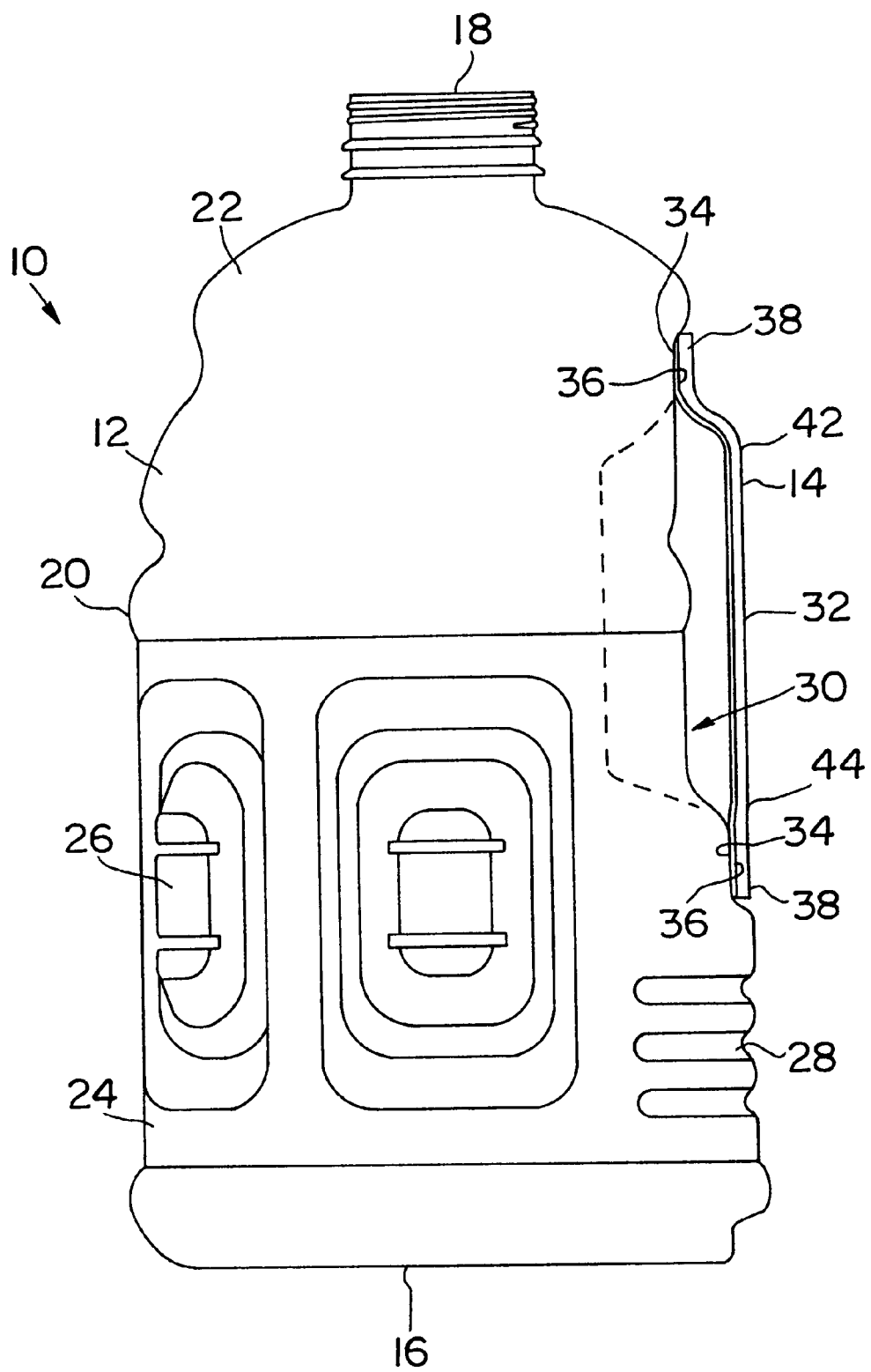
FIG. 1 is an elevational view of a container embodying the present invention.
Figure 2:
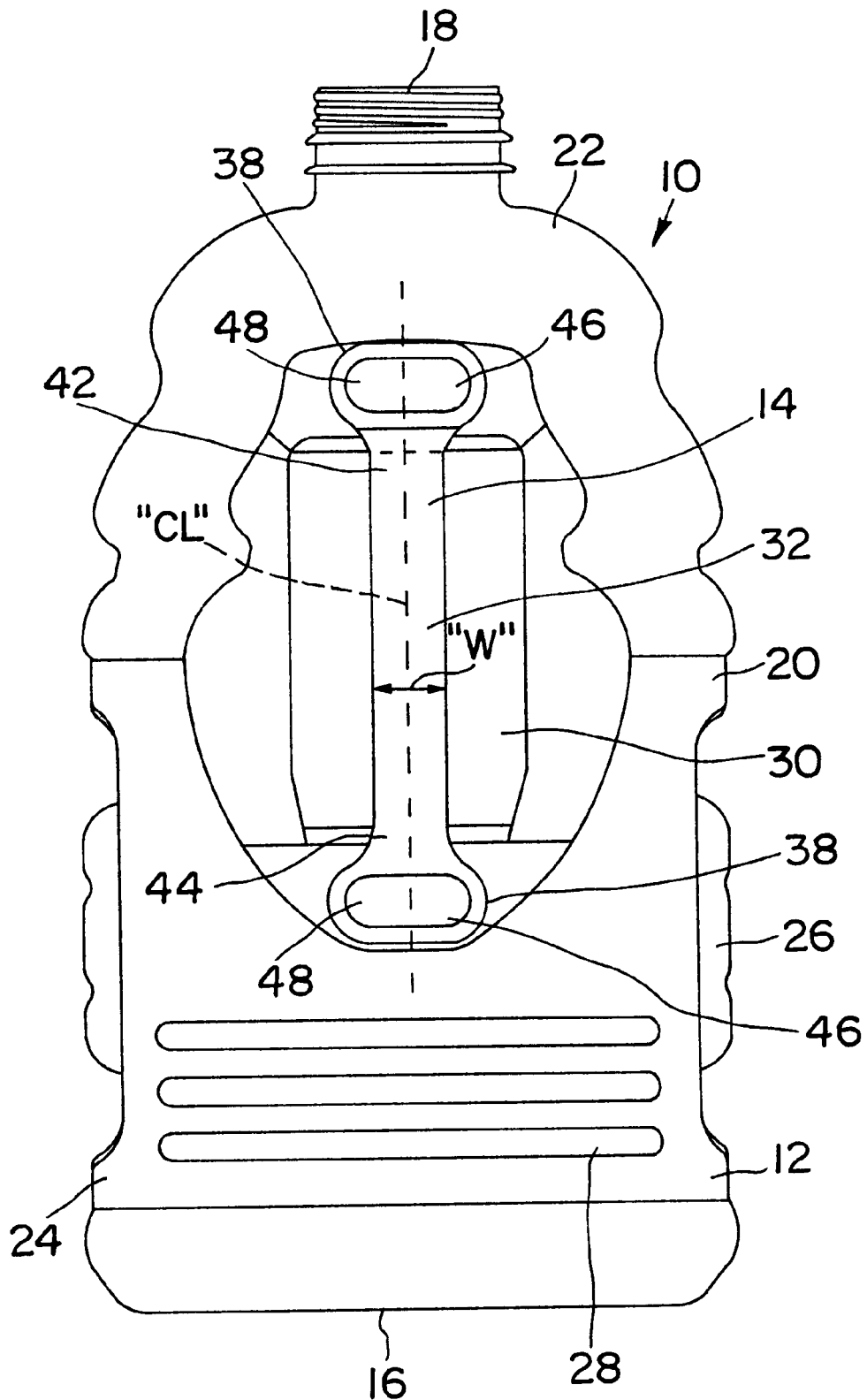
FIG. 2 is an elevational view of the container illustrated in FIG. 1 rotated 90° clockwise about a vertical axis.
Figure 4:
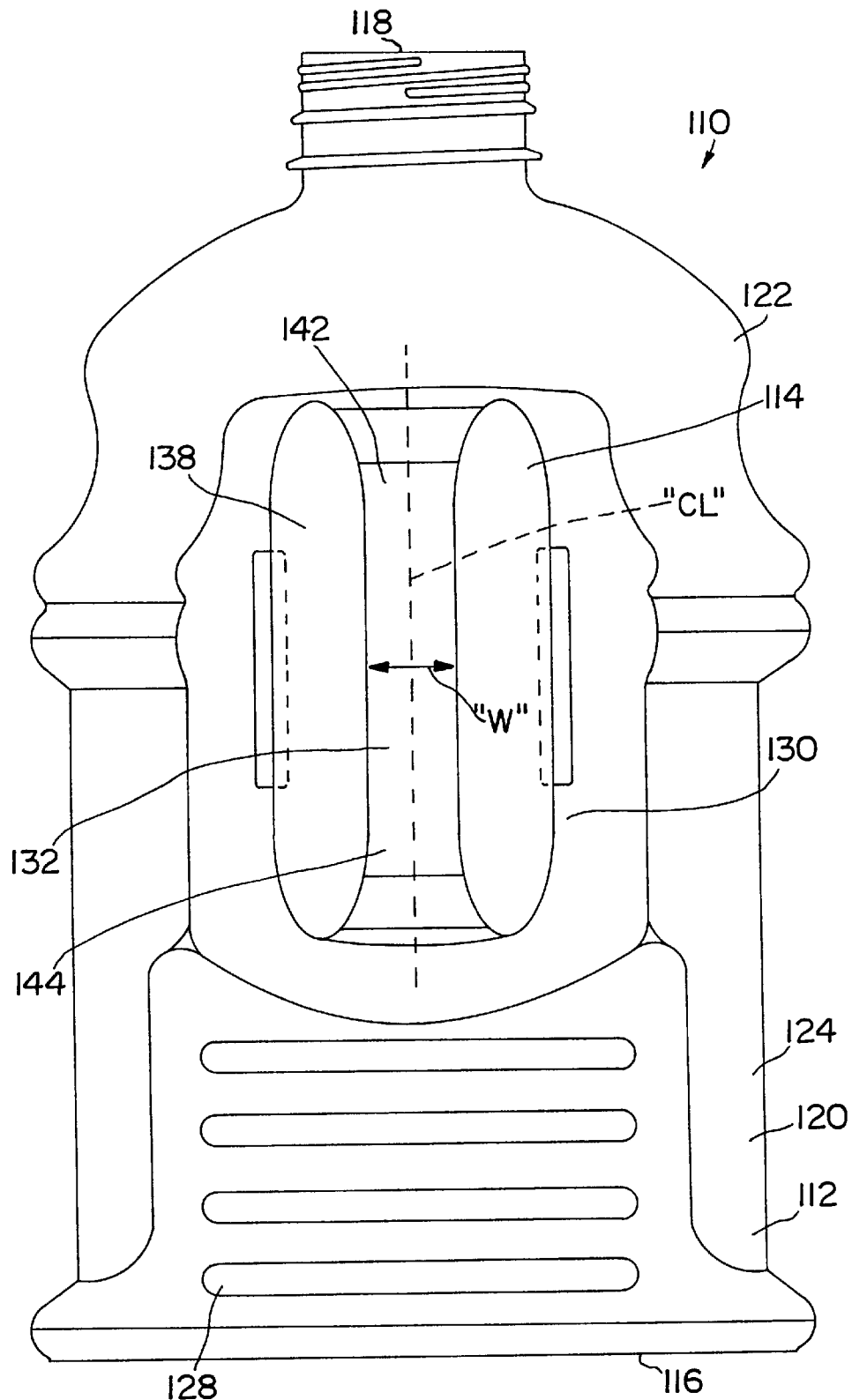
FIG. 4 is an elevational view of another container embodying the present invention.

Referring now to the drawings, FIGS. 1 and 2 illustrate one embodiment of a container 10 according to the present invention designed to enable a consumer to lift and pour from the container with one hand. An alternate embodiment of a container 110 according to the present invention is illustrated in FIG. 4. While the containers 10 and 110 can be manufactured in various sizes, the present invention is especially useful for larger sizes, such as a gallon, which typically require two hands to manipulate. The containers 10 and 110 can be used to package a variety of products, but are particularly useful in packaging beverages, such as juice.

The container 10 has a body 12 and a handle 14, and the container 110 has a body 112 and a handle 114. The container body and the handle for both containers 10 and 110 are formed separate from one another and then secured together at a later time. The container bodies are produced by conventional blow-molding operations, and the handles are preferably produced by conventional injection molding techniques. The container bodies and the handles are made from compatible plastics, such as PET, and are completely recyclable using current commercial techniques. Thus, each component of the container is made in accordance with known molding techniques using conventional technologies.

The container bodies 12 and 112 include several common, integrally formed, structural components. For instance, the container body 12 has a base 16 for supporting the container on a horizontal surface and a finish 18 providing an opening to fill, empty, and seal the container. A sidewall 20 extends from the base 16 to the finish 18. The sidewall 20 includes a dome 22 adjacent the finish 18 and a lower portion 24 providing a location for flex panels 26, reinforcement ribs 28, and labels (not shown). Similarly, the container body 112 has a base 116, a finish 118 and a sidewall 120. The sidewall 120 includes a dome 122 and a lower portion 124 providing a location for flex panels (not shown), reinforcement ribs 128, and labels (not shown). Thus, the configuration of the container bodies 12 and 112 enables the containers, 10 and 110, to be utilized in either hot-fill or non-hot-fill applications.

The container body 12 illustrated in FIGS. 1 and 2 includes a recess 30 in the sidewall 20 adjacent the location of the handle 14. Similarly, the container body 112 illustrated in FIG. 4 includes a recess 130 in the sidewall 120 adjacent the location of the handle 114. The recesses can be located in the lower portion, the dome, or both as illustrated in the drawings. In the illustrated embodiments, the handles extend completely across the recesses. The recesses allow the handles to remain within the contour of the sidewalls of the containers to facilitate efficient shipping and shelf storage. However, if these advantages are not desired, the recesses can be eliminated, and the handles can extend outside of the contour of the sidewalls.

The handle 14 has an elongate grip 32 and welding areas, or surfaces, 34 engagable with complementary welding areas, or surfaces, 36 on the container body 12. Handle 14 is a strap-type handle which is ultrasonically welded to the sidewall 20 of container 10 at welding area locations 36 above and below the recess 30. The grip 32 is spaced a sufficient distance from the sidewall 20 of the container body 12 so that a user can grasp the elongate grip 32 in his or her hand.

FIGS. 4–8 illustrate alternate handles, 114 and 214, which have loop-type constructions capable of being ultrasonically welded in recess 130 of the container 110. The handle 114 has an elongate grip 132 and a welding area, or surface, 134 engagable with a complementary welding area, or surface, 136 on the container body 112. The handle 214 has an elongate grip 232 and a hourglass-shaped welding area, or surface, 234. The grips 132 and 232 on the handles 114 and 214 are configured to be spaced a sufficient distance from the sidewall 120 of the container body 112 so that a user can grasp the elongate grips 132 and 232 in his or her hand.

Figure 5:
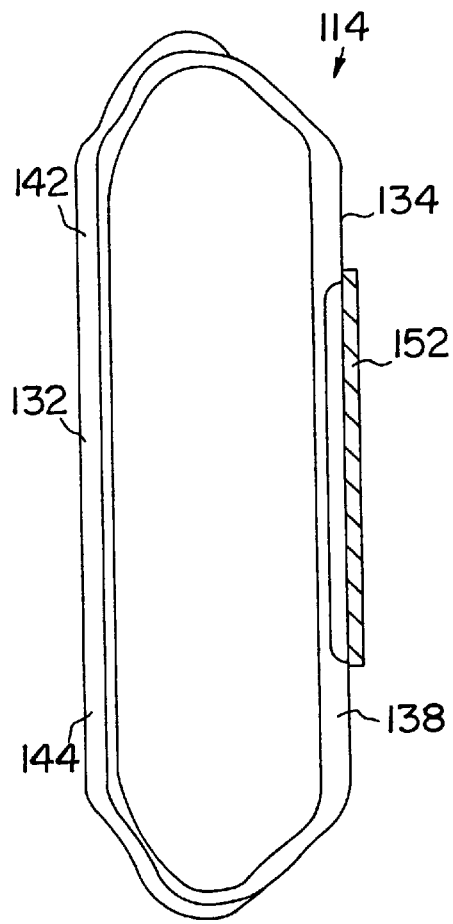
FIG. 5 is a side elevational view of a separately formed handle used on the container illustrated in FIG. 4.
Figure 6:
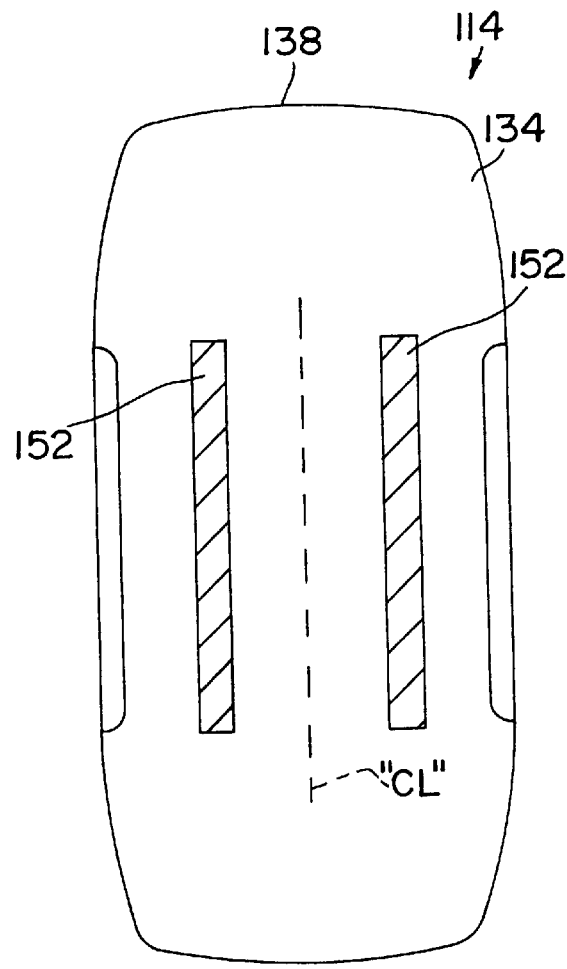
FIG. 6 is an elevational view of the welding area of the handle illustrated in FIG. 5.
Figure 7:
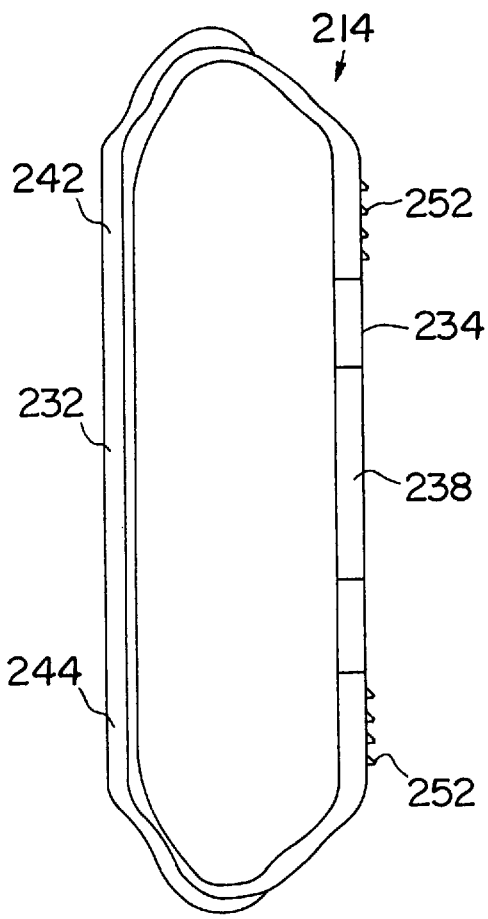
FIG. 7 is a side elevational view of an alternate separately formed handle capable of use on the container illustrated in FIG. 4.

Referring again to FIGS. 1 and 2, the handle 14 has a pair of attachment flanges 38 which provide the welding areas 34 on sides 40 thereof confronting the sidewall 20 of the container body 12. Each attachment flange 38 is integrally connected to the elongate grip 32 at its upper end 42 and its lower end 44. Alternatively, as illustrated in FIGS. 4–6, the handle 114 has a single attachment flange 138 connected to both upper and lower ends 142 and 144, and the handle 214, illustrated in FIGS. 7–8, has a single attachment flange 238 connected to both upper and lower ends 242 and 244. The attachment flanges 38, 138 and 238 can be of any shape; for instance, they can be oval, rectangular, circular, tab-like, or hourglass-shaped. Throughout this application, a racetrack shape, ie. an oval with parallel straight opposite sections connected at their ends with arcuate sections, is considered a type of oval.

Each attachment flange 38 has a side 46 which is opposite the welding area 34 and which preferably includes at least one depression 48 for receiving the tip of an ultrasonic welding horn (not shown). The depression 48 aids in aligning the welding horn on the handle 14 to ensure the ultrasonic energy is applied at targeted locations to effect a strong handle-to-container bond as will be discussed later in this application. The shape of the depression 48 can be, for instance, oval, rectangular, or circular. Plural, spaced-apart depressions 48 can also be used. The shape of the depression, or depressions, is mainly determined by the shape of the tip of the welding horn (not shown) which may include plural cylindrical tips.

Figure 3:
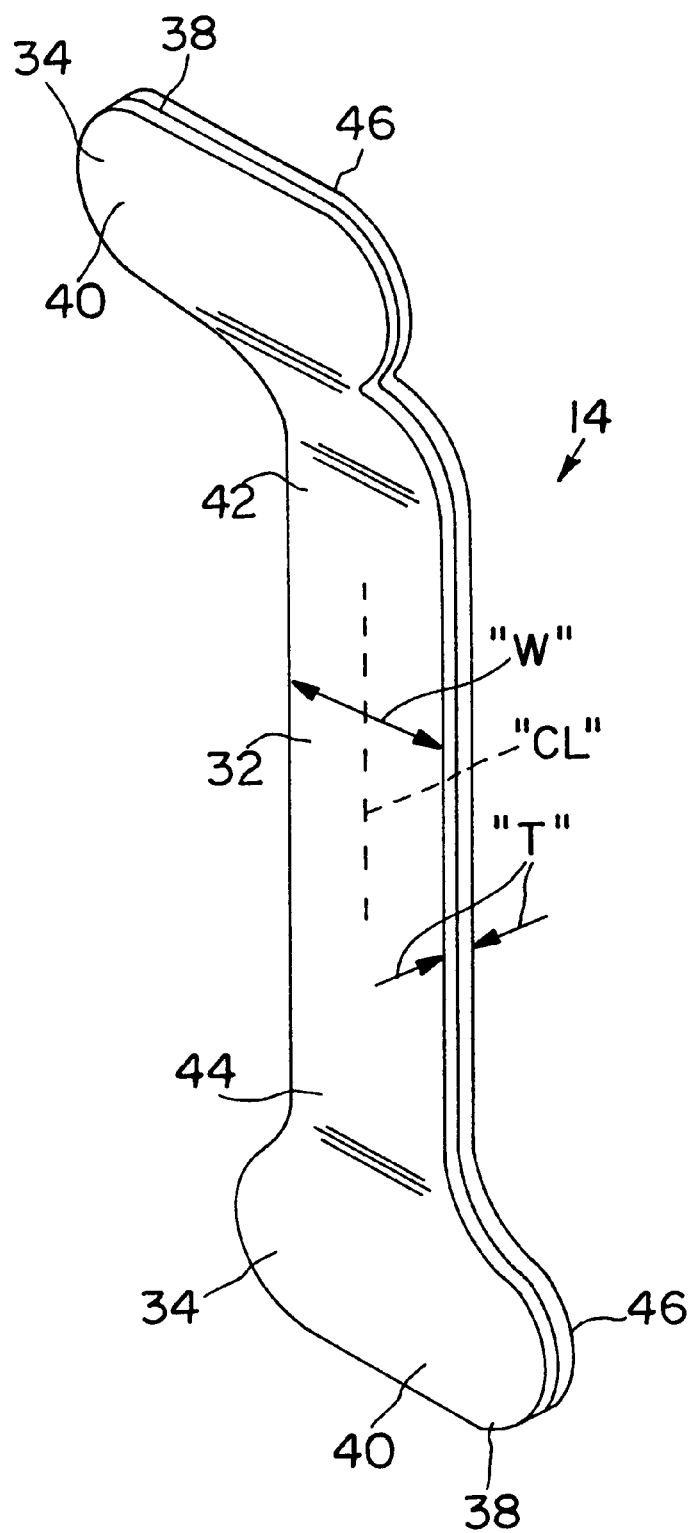
FIG. 3 is a perspective view of a separately formed handle according to the present invention.

For ease of injection molding, the handle 14 is preferably provided with a constant thickness "T". This facilitates even material flow to all sections of the injection mold cavity by eliminating high pressure zones. Such zones can impede the flow of molten plastic, thereby preventing the full formation of the part. To compensate for the depression, or depressions, 48, the welding area 34 can be provided on at least one offset region 50 which corresponds in shape to the shape of the depression 48. See FIGS. 9–12. Alternatively, if no depressions 48 are used, the welding area 34 can consist of the flat surface provided by the side 40 of the attachment flange 38 as illustrated in FIG. 3. Thus, the shape of the welding area 34 can be, for instance, oval, circular, rectangular, or hourglass-shaped. In addition, there may be multiple welding surfaces 34 on each attachment flange 38.

A pattern of energy directors is formed on either the welding surface of the handle and/or the complementary welding surface on the sidewall of the container, although preferably, as illustrated, the pattern is formed on the handle because it is easier to control the configurations with precision. For example, the handle 14 illustrated in FIG. 3 has a pair of flat welding surfaces 34 for confronting a container sidewall 20 having energy directors (not shown) formed integral with welding surfaces 36 on the sidewall 20. Alternately, as illustrated in FIGS. 5–18, the energy directors can be formed integrally with the welding surface of the handle.

The energy directors must be positioned relative to the elongate grip to create strong welds at strategic locations to enable filled gallon sized containers to be lifted and manipulated without breakage of the welds. Preferably, the energy directors are located on opposite lateral sides of a vertically extending centerline "CL" of the elongate grip. Preferably, the energy directors extend laterally beyond the width "W" of the grip. In addition, the energy directors are also preferably located adjacent the upper end and the lower end of the elongate grip.

The above mentioned strategic energy director placement is present in all of the patterns of energy directors illustrated in this application. For example, referring to FIGS. 5 and 6, a pair of vertically-oriented, spaced-apart, parallel, ridge-shaped energy directors 152 extend on opposite sides of the grip centerline "CL" and terminate adjacent the upper end 142 and lower end 144 of the elongate grip 132. Alternatively, referring to FIGS. 7 and 8, a plurality of horizontally-oriented, spaced-apart, parallel, elongate, ridged-shaped energy directors 252 also extend across opposite sides of the grip centerline "CL" and adjacent the upper end 242 and lower end 244 of the elongate grip 232.

Figure 9:
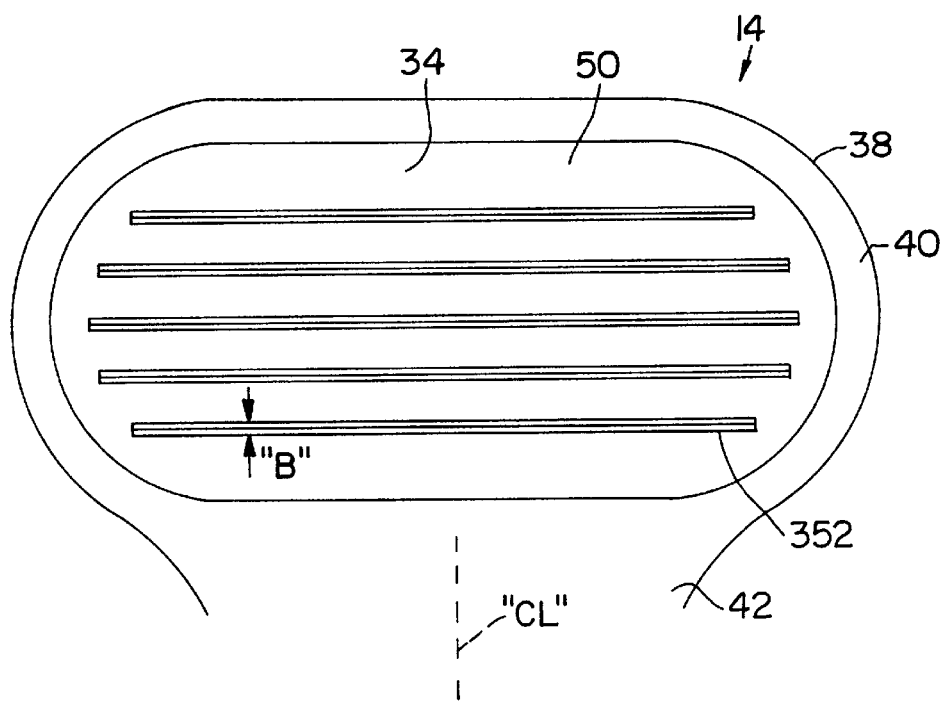
FIG. 9 is a partial elevational view of one embodiment of a welding area for the handle shown in FIG. 3.
Figure 10:
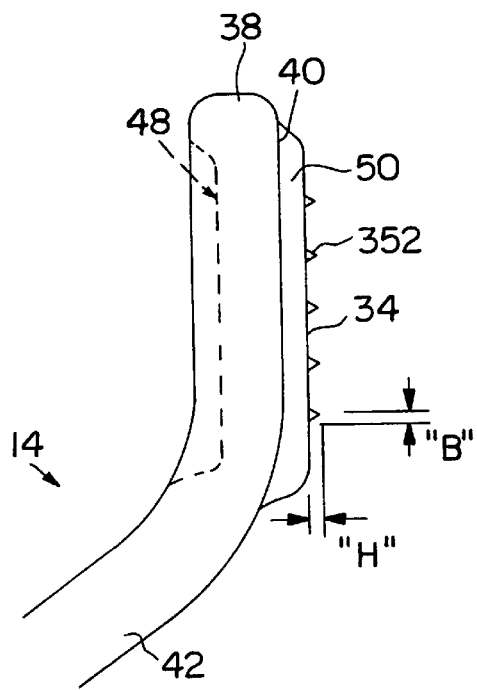
FIG. 10 is a side elevational view of the handle illustrated in FIG. 9.

The strap-type handle 14 illustrated in FIG. 3 preferably has a pattern of energy directors formed on its welding surfaces 38 to provide the above mentioned strategic placement. To this end, as best seen in FIGS. 9 and 10, a plurality of horizontally-oriented, parallel, elongate, ridged-shaped energy directors 352 extend across opposite sides of the grip centerline "CL" adjacent its upper end 42. Alternatively, referring to FIGS. 11 and 12, a plurality of concentric, spaced-apart, oval energy directors 452 extend across opposite sides of the grip centerline "CL" adjacent its upper end 42. The oval energy directors 452 are shown as being discontinuous and having a single horizontal energy director 452a centered therein.

Figure 16:
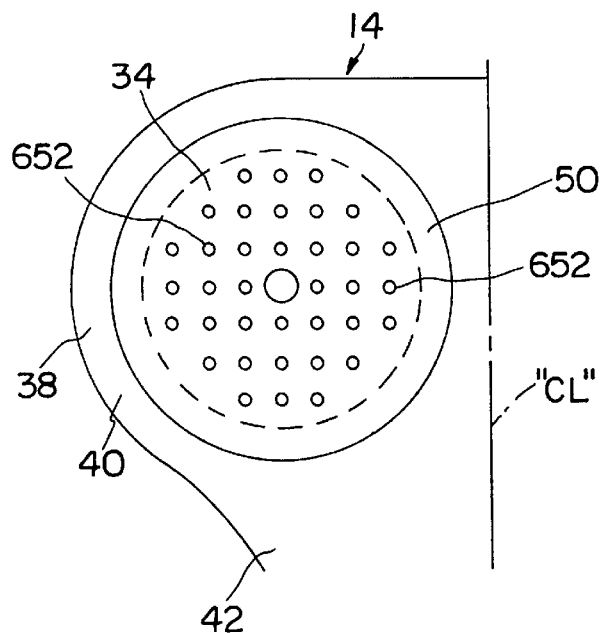
FIG. 16 is a partial elevational view of an alternate embodiment of a welding area for the handle shown in FIG. 3.
Figure 17:
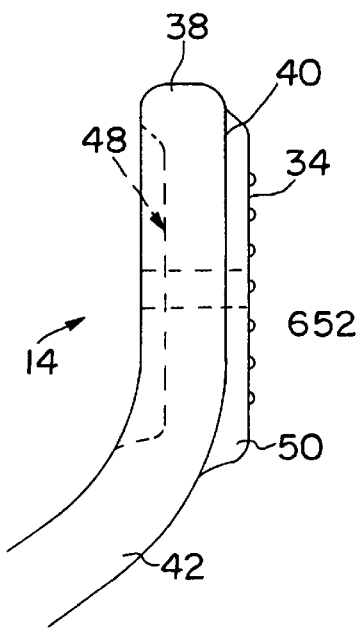
FIG. 17 is a side elevational view of the handle illustrated in FIG. 11.
Figure 18:
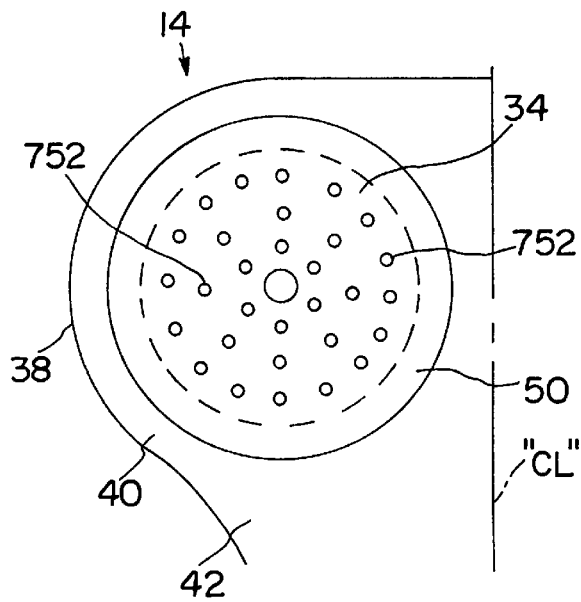
FIG. 18 is a partial elevational view of another alternate embodiment of a welding area for the handle shown in FIG. 3.

FIGS. 13–18 illustrate patterns of energy directors capable of use on the handle 14 shown in FIG. 3 when multiple welding surfaces 34 are located on each attachment flange 38. For illustrative purposes, only one side of the handle is shown relative to the grip centerline "CL" in FIGS. 13, 16 and 18, the other side being a mirror image thereof. The energy directors 552 of FIG. 13 are arcuate segments spaced apart endwise to form a pair of concentric rings. As a modification of the concentric ring pattern, FIG. 15 includes a plurality of canals, or grooves, 54 cut into the surface of welding surface 34 to provide radial paths for hot air to flow out between adjacent surfaces and for the molten plastic to flow before hardening. The energy directors 652 and 752 of FIGS. 16–14 18 are a plurality of arranged spikes. In FIG. 16 the spike energy directors 652 are arranged in a grid, and in FIG. 18 the spike energy directors 752 are arranged in an annular array.

Figure 8:
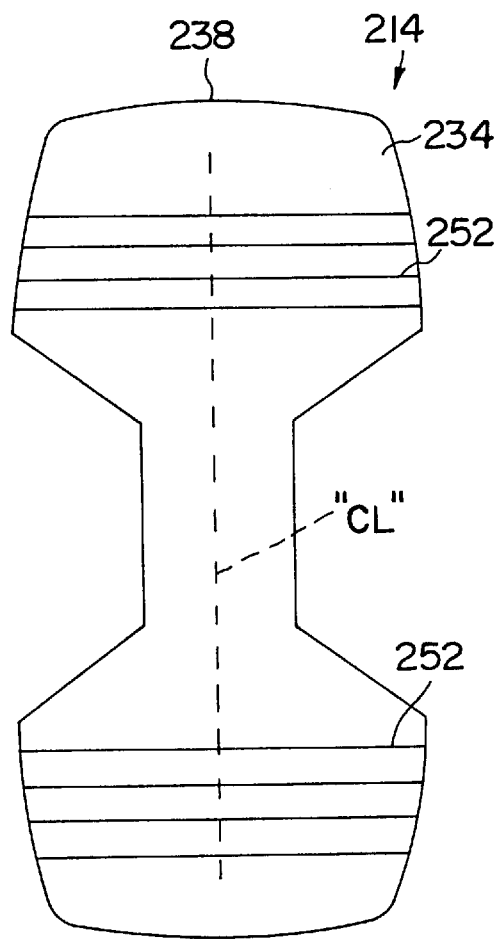
FIG. 8 is an elevational view of the welding area of the handle illustrated in FIG. 7.
Figure 11:
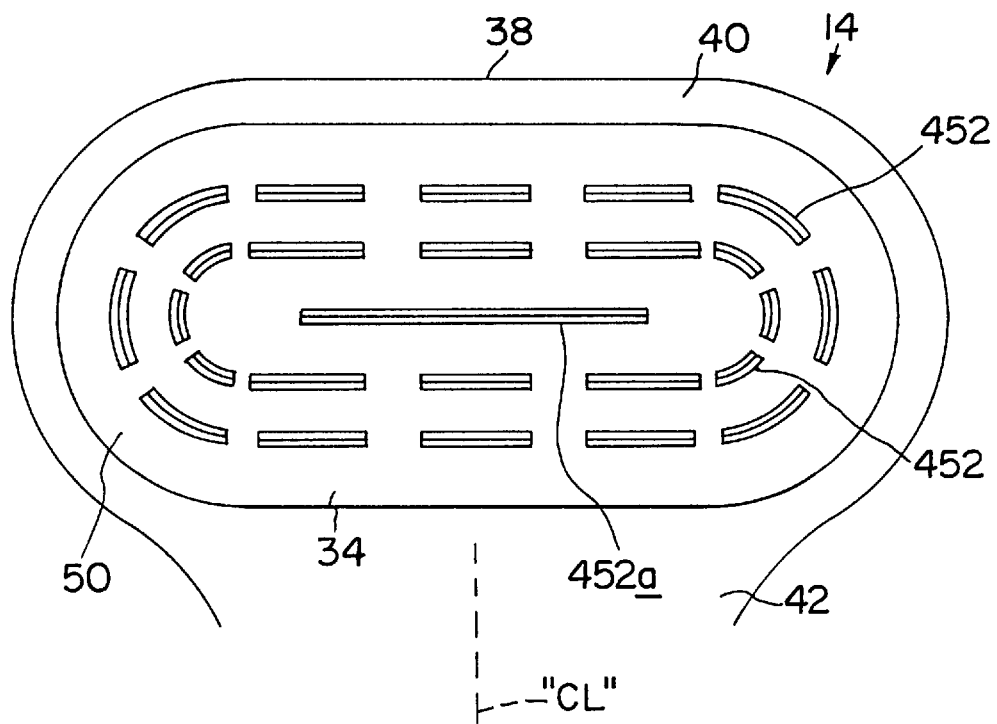
FIG. 11 is a partial elevational view of a second embodiment of a welding area for the handle shown in FIG. 3.
Figure 12:
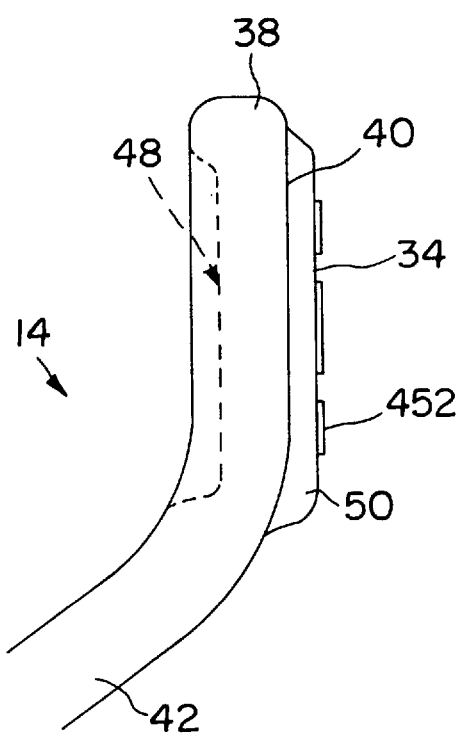
FIG. 12 is a side elevational view of the handle illustrated in FIG. 11.

By way of example, and not by way of limitation, each of the energy directors 352 preferably has a triangular shape in transverse cross-section. Each extends from the welding surface a height "H" of between about 0.005 inch to about 0.050 inch, preferably 0.02 inch±0.01 inch, and each has a base width "B" of between about 0.005 inch to about 0.050 inch where it merges with the handle attachment flange. The tip dihedral angle "TA" of the energy director is between about 45° to about 120°, preferably about 55°. In the embodiment of FIG. 8, the energy directors 252 are continuous and located on about 5/32 inch centers and extend the full width of the attachment flange, ie. about 2 inches. In the embodiment of FIG. 11, the rows outward of the medial row 452a are interrupted, ie. discontinuous. Discontinuous energy directors function much like vent channels (54 in FIG. 15), and apertures in attachment flanges (56 in FIG. 14) to facilitate the flow of hot air from between the adjacent surfaces during welding.

Also by way of example, and not by way of limitation, in the best mode currently contemplated by the inventors to practice the invention illustrated in FIGS. 9 and 10, the energy directors 352 are continuous straight lines about 1 inch long disposed horizontally on center to center spacings of about 0.20 inches. A total of 3 such energy directors are used. Each energy direction is triangular and has a width of about 0.20 inches, a height of about 0.20 inches, and a dihedral tip angle of about 55°. Sufficient ultrasonic energy is applied briefly with a force of 150–160 lbs applied between the handle and container to cause the energy directors to melt. The resulting welds, at upper and lower ends of the handle, provide a total pull strength of more than 50 pounds when the handle is pulled in a direction perpendicular to the longitudinal axis of the container.

While preferred container configurations, handle shapes, and energy director patterns have been described in detail, various modifications, alterations, and changes may be made without departing from the spirit and scope of the present invention as defined in the appended claims.

We claim:

1. An injection-molded plastic strap-type handle and a separately manufactured blow-molded plastic container, wherein said container has a hand-receiving recess and said handle is adapted to be attached to said container for spanning across said recessss, said handle comprising:

an elongate grip having an upper end and a lower end;

an upper attachment flange extending from said upper end of said elongate grip and having a welding surface for being disposed against the container at a location directly above the recess of the container; and a lower attachment flange, separate from said upper attachment flange, extending from said lower end of said elongate grip and having a welding surface for being disposed against the container at a location directly below the recess of the container such that said elongate grip spans the recess of the container;

said handle having a first pattern of energy directors formed integrally on said upper attachment flange welding surface and a second pattern of energy directors formed integrally on said lower attachment flange welding surface;

said first and second patterns of energy directors each having a plurality of parallel, spaced-apart, horizontally-elongate energy directors;

wherein an application of ultrasonic energy to the first and second patterns of energy directors causes the energy directors to melt and weld the upper and lower ends of the handle to the container.

2. A container and welded handle combination according to claim 1, wherein said elongate energy directors extend in a direction perpendicular to said elongate grip.

3. A container and welded handle combination according to claim 2, wherein said elongate grip has a centerline extending from said lower end to said upper end, and wherein each of said elongate energy directors on said upper and lower attachment flange welding surfaces extends laterally of said centerline on both sides thereof such that, when the upper and lower ends of the handle are welded to a container, the resulting welds provide a total pull strength of more than about 50 pounds when the handle is pulled in a direction perpendicular to a longitudinal axis of the container.

4. A container and welded handle combination according to claim 3, wherein said elongate grip has a width, and wherein each of said elongate energy directors has a length greater than said width of said elongate grip.

5. A container and welded handle combination according to claim 4, wherein each of said elongate energy directors is triangular in cross section.

6. A container and welded handle combination according to claim 5, wherein said triangular cross-sectioned energy directors have a tip formed with a dihedral angle of between about 45° to about 120°.

7. A container and welded handle combination according to claim 5, wherein each of said elongate energy directors has a base with a width of between about 0.005 to 0.050 inches, and a height of between about 0.005 to 0.050 inches.

8. A container and welded handle combination according to claim 4, wherein each of said attachment flanges has an oval shape.

9. A container and welded handle combination according to claim 8, wherein each of said attachment flanges has a side opposite from said welding surfaces, and each of said opposite sides has a depression formed therein for receiving and aligning a horn used to apply ultrasonic energy.

10. A container and welded handle combination according to claim 9, wherein each of said depressions has an oval shape.

11. A container and welded handle combination according to claim 4, wherein each of said welding surfaces has at least one canal formed therein.

* * * * *